United States Patent
Russ et al.

(10) Patent No.: US 6,237,559 B1
(45) Date of Patent: May 29, 2001

(54) CYLINDER DEACTIVATION VIA EXHAUST VALVE DEACTIVATION AND INTAKE CAM RETARD

(75) Inventors: Stephen George Russ, Canton; Robert Albert Stein, Saline; William Francis Stockhausen, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/537,648

(22) Filed: Mar. 29, 2000

(51) Int. Cl.$^7$ .................................................. F02B 77/00
(52) U.S. Cl. ............................................................ 123/198 F
(58) Field of Search ........................................ 123/198 F

(56) References Cited

U.S. PATENT DOCUMENTS

| | | |
|---|---|---|
| 3,441,009 | 4/1969 | Rafanelli . |
| 4,516,542 * | 5/1985 | Aoyoma et al. ............... 123/90.16 |
| 4,862,845 | 9/1989 | Butterfield et al. . |
| 5,467,748 | 11/1995 | Stockhausen . |
| 5,642,703 | 7/1997 | Stockhausen . |

FOREIGN PATENT DOCUMENTS 59-201911   11/1984   (JP) .

* cited by examiner

*Primary Examiner*—Noah P. Kamen
(74) *Attorney, Agent, or Firm*—Jerome R. Drouillard

(57) ABSTRACT

An arrangement of a four-cycle internal combustion engine is provided. The engine arrangement 8 has at least a first combustion chamber 12 with a reciprocating piston 15 mounted therein. The first combustion chamber or chambers have a cam-driven intake and exhaust poppet valves. At least a second combustion chamber 12 is provided. The second combustion chamber has a reciprocating piston 15 mounted therein. The reciprocating piston 15 of the second combustion chamber 12 has a top dead center position and a bottom dead center position. The second combustion chamber also has a cam 18 driven exhaust poppet valve 14 which can be selectively disabled to a closed position to deactivate the second combustion chamber. The second combustion chamber also has a variable phase cam 18 driven intake poppet valve 16 to selectively set the opening and closing operation of the intake valve 14 to be generally symmetric about one of the piston center positions.

19 Claims, 4 Drawing Sheets

CYLINDER DEACTIVATION VIA EXHAUST VALVE DEACTIVATION AND INTAKE CAM RETARD

FIELD OF THE INVENTION

The field of the present invention is that of automotive engines, in particularly automotive engines having cylinder deactivation.

BACKGROUND OF THE INVENTION

Four stroke cylinder multi-cylinder reciprocating internal combustion engines used in automobiles are capable of being operated over great speed and load ranges. Those skilled in the art have recognized for years that lower specific fuel consumption is usually achieved when an engine is operated at relatively high load. This is particularly true for spark ignition engines because throttling losses are minimized when the engine is operated at or near wide-open throttle at full load conditions. Unfortunately, in automotive usage, engines are frequently required to operate at less than maximum load. While an engine operates at part load, fuel economy suffers because of the pumping loss. Therefore, it is desirable to avoid partial load operation of the engine.

Engines have been designed that avoid part-load operation by deactivating some of the cylinder combustion chambers so as to allow the remaining active cylinders to be operated at higher loads. For example, it is noted to deactivate both the intake and outlet valves of one or more cylinders in an engine, which traps air in the deactivated cylinders. The trapped air is alternately compressed and expanded and acts as a pneumatic spring (See FIG. 3). This method of cylinder deactivation is highly efficient however, a small problem can occur at low pressures at bottom dead center piston position with oil pumping into the cylinder. More significantly, prior art systems which deactivate both the intake and exhaust poppet valves of an engine cylinder are quite expensive and are therefore unattractive because vehicles in which fuel economy is most important are frequently sold in a lower price range.

Stockhausen et al., U.S. Pat. No. 5,642,703 commonly assigned, provides an internal combustion engine wherein the operation of the intake and exhaust poppet valves are phase retarded in equal amount to produce valve lift events which are approximately symmetric with respect to the bottom dead and the top dead center positions of the piston motion, respectively. The phase retardation of the intake and exhaust poppet valves results in gas being expelled during the exhaust stroke back into the manifold to be reintroduced into the cylinder during the start of the intake stroke and gas being introduced into the cylinder at the end of the intake stroke being pushed back out of the cylinder during the start of the compression stroke. The engine of Stockhausen et al. has a slight pump working penalty. Additionally, controlling the transition between actuated cylinder condition and deactivated cylinder condition can sometimes be difficult. It is also difficult to determine the point of no net flow. Lastly, the internal combustion engine according to Stockhausen et al. requires increased exhaust valve to piston clearance (needs nearly a free wheeling engine) and a very wide range (90 degrees) cam retard phase shifter with rapid response is required.

SUMMARY OF THE INVENTION

The present invention provides a four-cycle internal combustion engine with cylinder combustion chamber deactivation with very low pumping losses. The deactivated cylinder of the present invention has an exhaust poppet valve which can be selectively disabled. The intake poppet valve or valves of the deactivated cylinders are not disabled but are opened and closed generally symmetrically about a top dead center or bottom dead end center position of the piston. The change from normal operation of the intake poppet valve is achieved by a phase variable cam. Often the phase variable cam is already provided as a method of reducing fuel gas emissions and improving fuel economy. In one preferred embodiment of the invention, the opening and closing of the inlet valve is retarded approximately 65 degrees. Accordingly, the intake event is symmetric about the piston bottom dead center position. Equal amounts of flow are pulled into the deactivated cylinder during the intake cycle and expelled from the cylinder during the first part of the compression stroke thereby minimizing pumping work. The present inventive internal combustion engine is highly adaptable to deactivate one bank of cylinders in any bank-to-bank firing engine. The level of intake cam retard required by one preferred embodiment of the present invention is only slightly more than typical for part-load dual cam equal cam phasing engines which already require approximately 50 degrees of retard. The internal combustion engine of the phase retarded version of the present invention does not require any additional exhaust valve-to-piston clearance. The present invention provides cylinder deactivation at a much lower cost in engines that already incorporate dual equal or intake-only cam phasers. In engines where there is dual variable cam timing, the engine only requires valve disablement for the exhaust valves on one bank of the engine. No valve disablement will be required for any of the intake valves.

It is an object of the present invention to provide a four-cycle internal combustion engine that has cylinder deactivation by disabling the exhaust poppet valve on the deactivated cylinder to a closed position and phase varying the operation of the inlet poppet valve so that pumping losses are significantly reduced.

The above noted object and other features of the present invention will become better known to one skilled in the art from a review of the accompanying drawings and detailed description of the invention.

DETAILED DESCRIPTION OF THE DRAWINGS

Figure 1:
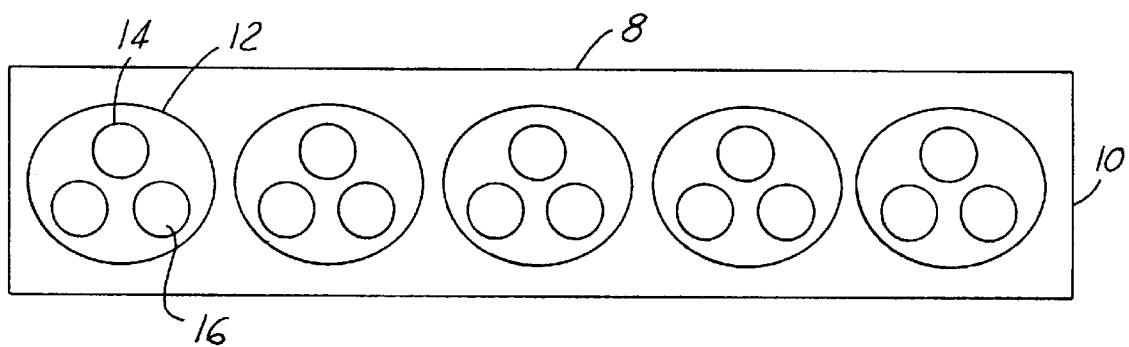
FIG. 1 is a schematic view of a single bank of deactivatable cylinder combustion chambers in a V-10 internal combustion engine built and operated according to the principles of the present invention wherein each cylinder has a single exhaust and dual intake poppet valves.

Referring to FIGS. 1–7, a four-cycle internal combustion engine arrangement 8 built and operated according to the present invention has ten cylindrical combustion chambers 12 which are presented in a V-formation. One bank of combustion chambers (not shown) has a normal configuration, a second bank 10 of combustion chambers 12 is shown in FIG. 1. Each combustion chamber 12 has a reciprocating piston 15 slidably mounted therein. In a conventional manner, the piston 15 is pivotally connected with a piston rod 19 which is in turn pivotally connected on an engine crank shaft (not shown).

Figures 6, 7:
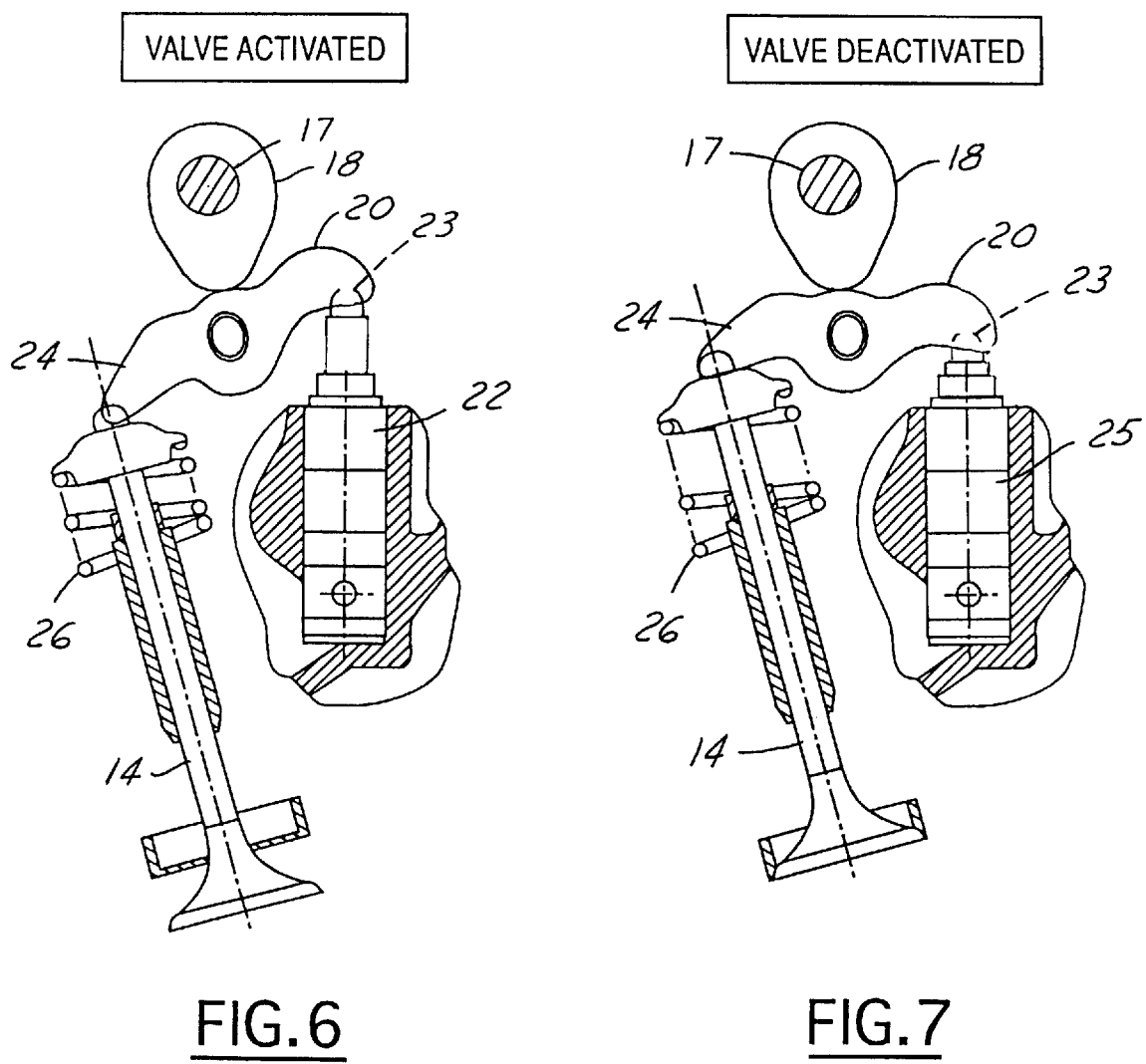
FIGS. 6 and 7 give an example of a poppet valve disablement which can be utilized on the exhaust valve in an internal combustion engine arrangement of the present invention.

Each combustion chamber 12 has a single exhaust poppet valve 14 and two intake poppet valves 16. The exhaust poppet valves 14 are driven by a phase variable cam shaft 17 (FIGS. 6 and 7). The cam shaft 17 has connected thereto a series of cams 18 (only one shown). Each of the cams 18 contacts a rocker arm 20. The rocker arm 20 (associated with an exhaust valve 14 of one of the deactivatable combustion chambers 12), on one end pivots on a fulcrum 23. The fulcrum 23 is provided by the end of a hydraulic valve lifter 22. An opposite end 24 of the rocker arm 20 pushes a top end of the exhaust valve 14 downward to open the exhaust valve 14 when the cam 18 is at the position shown. When the cam 18 is rotated from its extreme radially outward position to a side position (not shown), a spring 26 in a conventional manner closes the exhaust valve 14. To deactivate the exhaust valve 14, fluid is removed from under the piston 25. The exhaust valve 14 is then moved by spring 26 biased vertically upward to its closed position.

Figure 2A:
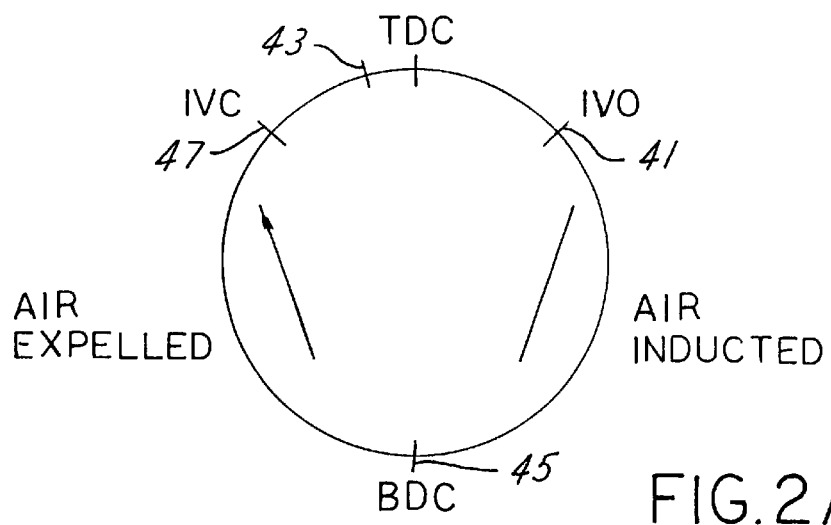
FIG. 2A is a schematic view illustrating opening and closing timing of the inlet poppet valves in the internal combustion engine with the deactivatable combustion chambers as shown in FIG. 1 wherein the opening and closing of the intake poppet valves for a deactivated cylinder are retarded to be generally symmetric about a bottom dead center position of an engine piston.
Figure 4:
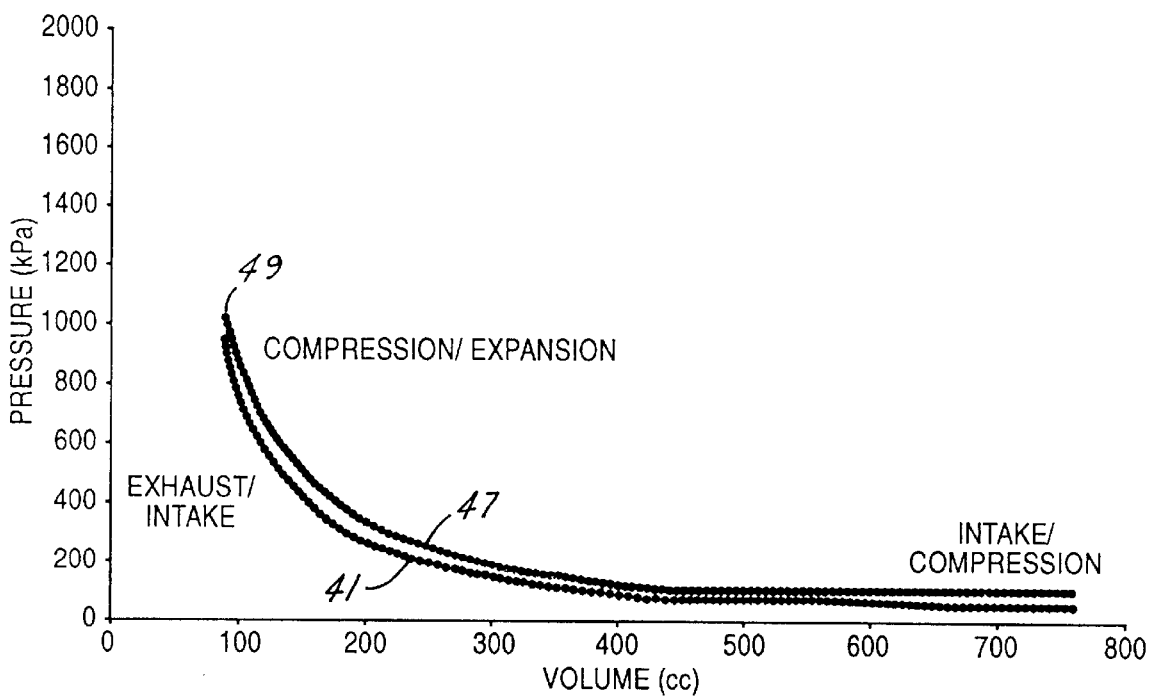
FIG. 4 is a pressure volume diagram similar to that of FIG. 3 illustrating the work of a deactivated cylinder in an internal combustion engine arrangement according to the present invention.

Referring to FIGS. 2A, 4 and 5, an engine controller (not shown) under the appropriate low load conditions will signal for a deactivation of the cylinders 12. For each deactivated cylinder 12, valve lifter 22 will be signaled to move the fulcrum 23 down to disable the exhaust valve 14.

Figure 5A:
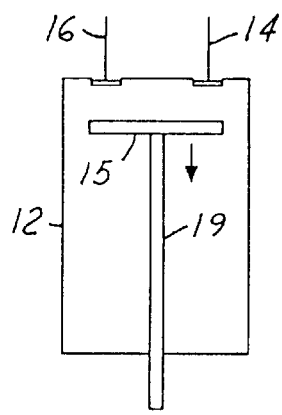
FIGS. 5A through 5H are schematic views illustrating the operation of the inlet and outlet poppet valves during the deactivated stage of operation of a cylinder in the internal combustion engine arrangement according to the present invention.
Figure 5B:
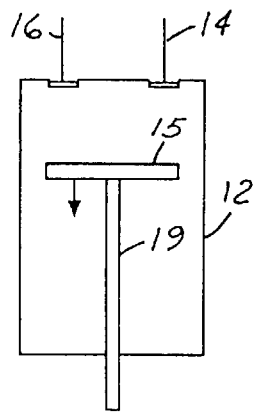
Figure 5C:
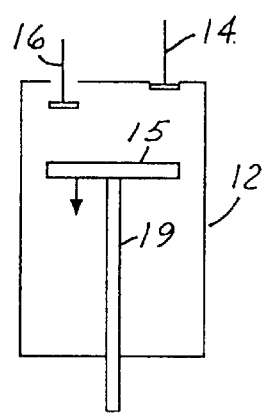
Figure 5D:
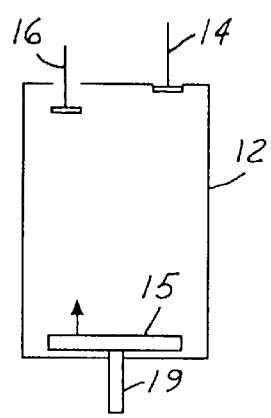
Figure 5E:
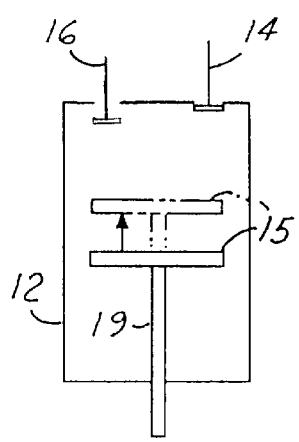
Figure 5F:
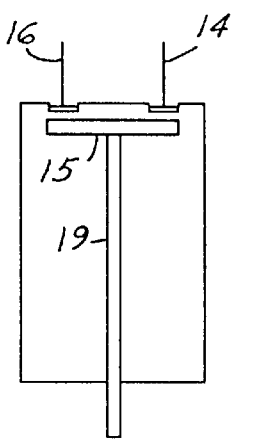
Figure 5G:
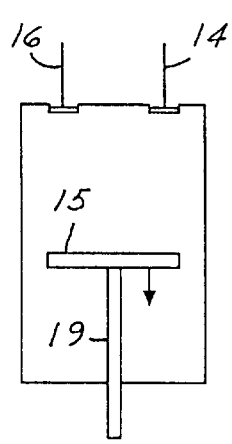
Figure 5H:
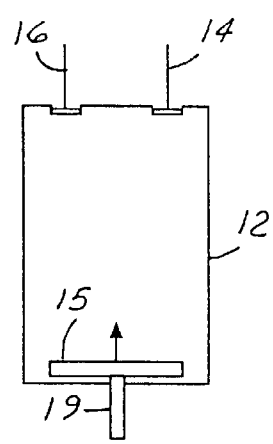

Referring in particular to FIGS. 2A and 5A–5H intake valves 16 are operated by a phase retardable cam. Typically the cam can be on the same cam shaft 17 which drives the exhaust valve 14. The cam shaft 17 and associated cams are retarded by a cam phaser such as a helical spline phaser found on the Ford Motor Company 2.0 L Escort engine. The retardation will be between 60 and 70 degrees and is preferably 65 degrees and is symmetric about the bottom dead center position 45 of the piston (FIG. 2). In FIG. 5A, the exhaust valve 14 has been disabled to its closed position. The inlet stroke of the piston 15 is beginning. In normal operation the inlet valve 16 opens during the very last stages of the exhaust stroke of the piston 15. In FIG. 5B, the piston 15 has moved downward. As shown in FIG. 5B, the intake valve 16 is still closed during the initial inlet stroke. The initial valve opening (IVO) of valve 16 is shown in FIG. 5C and, in FIG. 2 at point 41 is approximately 60 to 70 degrees and preferably 65 degrees from the normal initial valve opening point 43 which is 10 to 15 degrees from the top dead center position of the piston 15. Referring to FIG. 4, the IVO will take place at approximately 55 crank angle degrees after top dead center at point 41. At the piston 15 bottom dead center position 45, shown in FIGS. 2 and 5D, the intake valve 16 is still open. At the position of the piston 15 in FIG. 5E, during the compression stroke the intake valve 16 remains open at position 5E and only closes at the phantom position shown in FIG. 5E approximately 55 crank angle degrees before top dead center. From the position shown in phantom in FIG. 5E, and FIG. 4 at initial valve closing (IVC) at 47, the inlet valve 16 is closed. Referring to FIG. 4, the entrapped gas is compressed during the remainder of the compression stroke until the piston 15 reaches the top dead center position shown in FIG. 5F. Following the top dead center position, the piston 15 moves downward. As shown in FIG. 5G, during the expansion stroke both the inlet valve 16 and the exhaust valve 14 are closed and any remaining gas within the cylinder will be expanded. As shown in FIG. 5H, the compression stroke will work to compress the entrapped air, which act as a spring and again will be compressed during the exhaust stroke. The improvement brought about by the present invention is shown in the diagram of FIG. 4 over the pressure volume diagram of FIG. 3. Due to the retardation of the inlet valve 14 the volume of air pumped into the cylinder 12 is lessened.

Figure 2B:
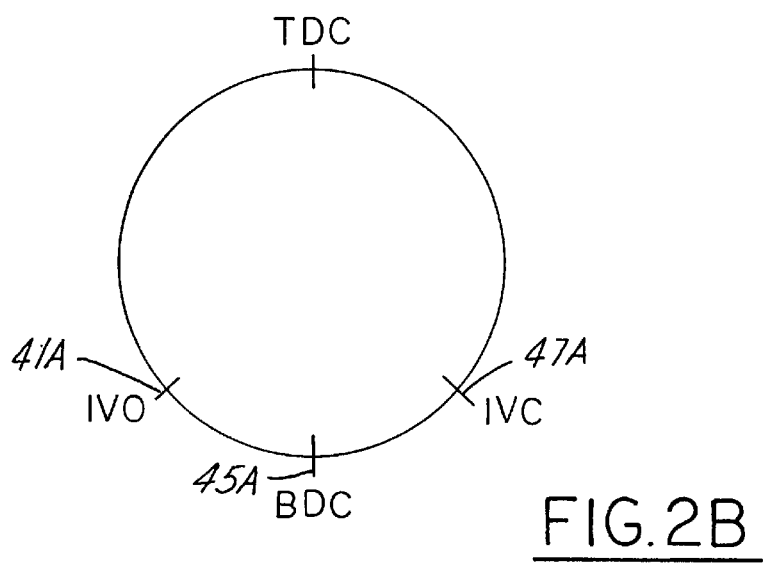
FIG. 2B is a schematic view illustrating opening and closing timing of the inlet poppet valves in the internal combustion engine with the deactivatable combustion chambers as shown in FIG. 1, wherein the opening and closing of the intake poppet valves for a deactivated cylinder are advanced to be generally symmetric about a top dead center position of an engine piston.
Figure 3:
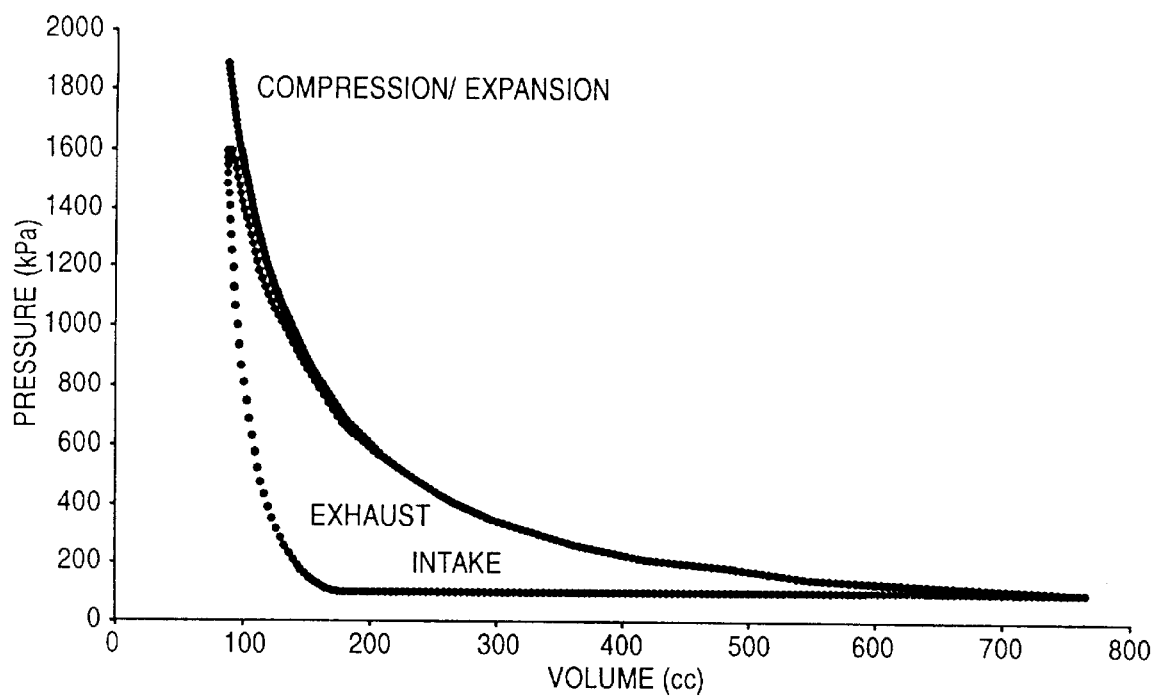
FIG. 3 is a pressure volume diagram illustrating work of a deactivated cylindrical combustion chamber which has a disabled exhaust poppet valve and a normal phase operating inlet poppet valve inlet.

FIG. 2B illustrates an alternate embodiment of the present invention. The engine arrangement shown in FIG. 2B is identical to that described with limited exception. In the alternative embodiment presented by FIG. 2B, the IVO 41A and the IVC 47A are symmetrical about the top dead center position of the piston. In a manner as previously described, the exhaust poppet valve 14 is disabled. The engine arrangement and method of FIG. 2B requires a greater clearance between the top dead center position of the piston 15 and the top of the combustion chamber 12 since the inlet valve 16 is open when the piston 15 is at the top dead center position. Accordingly, for most applications the embodiment of the invention shown in FIG. 2A will be found to be preferable.

The present inventive engine arrangement and method of operation thereof has been shown in several preferred embodiments. However, it will be apparent to those skilled in the art that various modifications can be made to the present invention without departing from the spirit and scope of the invention as described herein and as encompassed by the following claims.

We claim:

1. An arrangement of a four-cycle internal combustion engine comprising:
   at least a first combustion chamber with a reciprocating piston mounted herein, said first combustion chamber having cam driven intake and exhaust poppet valves; and
   at least a second combustion chamber with a reciprocating piston mounted therein, said piston having a top dead center and a bottom dead center position, said second combustion chamber having a cam driven exhaust poppet valve which can be selectively disabled to a closed position to deactivate said second combustion chamber, said second combustion chamber also having a variable phase cam driven intake poppet valve to selectively set a generally constant duration opening and closing operation of said intake valve to be generally symmetrically about one of said center positions during said second combustion chamber deactivation.

2. An internal combustion engine as described in claim 1, wherein said opening and closing operation of said intake valve for said second cylinder, when said second combustion chamber is deactivated is generally symmetric about said bottom dead center position of said reciprocating piston within said second chamber.

3. An arrangement of an internal combustion engine as described in claim 4, wherein said selective set of said opening of said intake poppet valve is retarded approximately 60 to 70 degrees from a normal opening of said intake poppet valve during said deactivation of said second combustion chamber.

4. An arrangement of an internal combustion engine as described in claim 3, wherein said selective set of said opening of said second combustion chamber intake valve is retarded approximately 65 degrees from a normal opening of said second combustion chamber intake valve.

5. An internal combustion engine as described in claim 1, wherein said opening and closing operation of said intake valve for said second cylinder, when said second combustion chamber is deactivated, is generally symmetric about said top dead center position of said reciprocating piston within said second chamber.

6. An arrangement of an internal combustion engine as described in claim 1, wherein said first combustion chamber is in a first bank and said second cylinder is in a second bank and wherein an ignition of said engine is from bank-to-bank.

7. An arrangement of an internal combustion engine as described in claim 1, wherein said second combustion chamber has one exhaust poppet valve and multiple inlet poppet valves and said inlet poppet valves are driven by a common cam shaft.

8. An arrangement of an internal combustion engine as described in claim 7, wherein a common cam shaft drives cams for said intake and exhaust valves for said second combustion chamber.

9. A method of operating a four-cycle internal combustion engine having a plurality of combustion chambers with reciprocating pistons with cam driven intake and outlet valves, said pistons having a top dead center position and a bottom dead center position, said method including selective deactivation of at least one of said combustion chambers, said method including:
    disabling said cam driven exhaust poppet valve for said deactivated combustion chamber; and
    varying a phase of generally constant duration operation of said cam driving said deactivated combustion chamber poppet valve opening and closing to be generally symmetrical about one of said piston center positions.

10. A method of operating an internal combustion engine as described in claim 9, wherein said operation of said poppet valve for said deactivated combustion chamber is generally symmetrical about said bottom dead center position of said piston.

11. A method of operating an internal combustion engine as described in claim 10, wherein said opening operation of said intake poppet valve is retarded approximately 60 to 70 degrees from a normal opening of said piston during the deactivation of said combustion chamber.

12. A method of operating an internal combustion engine as described in claim 11, wherein said opening of said deactivated combustion chamber intake valve is retarded approximately 65 degrees.

13. A method of operating an internal combustion engine as described in claim 9, wherein there is a plurality of deactivated combustion chambers, and said deactivated combustion chambers are in a second bank of combustion chambers and wherein non-deactivated combustion chambers are in a first bank of combustion chambers and an ignition of said engine is from bank-to-bank.

14. A method of operating an internal combustion engine as described in claim 9, wherein the deactivatable combustion chamber has one exhaust poppet valve and multiple inlet poppet valves and said inlet poppet valves are driven by a common cam shaft.

15. An arrangement of a four-cycle internal combustion engine comprising:
    a first bank of a plurality of combustion chambers with reciprocating pistons mounted therein, said first bank of combustion chambers having cam driven intake and exhaust poppet valves, said first bank of combustion chambers being inclined;
    a second bank of a plurality of combustion chambers, each said chamber having a single exhaust poppet valve and multiple intake valves, said pistons within said second combustion chambers having a top dead center position and a bottom dead center position; and
    each of said second bank combustion chambers having an exhaust poppet valve which can be selectively disabled to a closed position to deactivate said second combustion chambers, said second combustion chambers also having variable phase retardable cam driven intake poppet valves to retard the opening and closing operation of said intake valves to be generally symmetric about a bottom dead center position of said reciprocating pistons during said second combustion chamber deactivation.

16. An arrangement of a four-cycle internal combustion engine comprising:
    at least a first combustion chamber with a reciprocating piston mounted herein, said first combustion chamber having cam driven intake and exhaust poppet valves; and
    at least a second combustion chamber with a reciprocating piston mounted therein, said piston having a top dead center and a bottom dead center position, said second combustion chamber having a cam driven exhaust poppet valve which can be selectively disabled to a closed position to deactivate said second combustion chamber, said second combustion chamber also having a variable phase cam driven intake poppet valve to selectively set the opening and closing operation of said intake valve to be generally symmetrically about said top dead center position approximately 60 to 70 degrees with an opening of said intake poppet valve being advanced to approximately 60 to 70 degrees from bottom dead center during said second combustion chamber deactivation.

17. An arrangement of an internal combustion engine as described in claim 16, wherein said selective set of said second combustion chamber intake valve opening is advanced approximately 65 degrees from bottom dead center.

18. A method of operating a four-cycle internal combustion engine having a plurality of combustion chambers with reciprocating pistons with cam driven intake and outlet valves, said pistons having a top dead center position and a bottom dead center position, said method including selective deactivation of at least one of said combustion chambers, said method including:
    disabling said cam driven exhaust poppet valve for said deactivated combustion chamber; and
    varying a phase of operation of said cam driving said deactivated combustion chamber inlet poppet valve opening and closing to be generally symmetrical about said piston top dead center position and said opening of said inlet poppet valve is advanced to be 60 to 70 degrees from said bottom dead center position.

19. A method of operating an internal combustion engine as described in claim 18, wherein said opening of said deactivated combustion chamber intake poppet valve is approximately 65 degrees from said bottom dead center position.

\* \* \* \* \*